(12) United States Patent
Dam

(10) Patent No.: US 11,916,379 B2
(45) Date of Patent: *Feb. 27, 2024

(54) VALIDATING POWER NETWORK MODELS FOR MONITORING AND CORRECTING OPERATION OF ELECTRIC POWER NETWORKS

(71) Applicant: LANDIS+GYR INNOVATIONS, INC., Alpharetta, GA (US)

(72) Inventor: Quang Binh Dam, Alpharetta, GA (US)

(73) Assignee: Landis+Gyr Technology, Inc., Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/826,376

(22) Filed: May 27, 2022

(65) Prior Publication Data

US 2022/0285982 A1  Sep. 8, 2022

Related U.S. Application Data

(63) Continuation of application No. 16/701,425, filed on Dec. 3, 2019, now Pat. No. 11,349,338, which is a (Continued)

(51) Int. Cl.
*H02J 3/06* (2006.01)
*H02J 13/00* (2006.01)
(Continued)

(52) U.S. Cl.
CPC ...... *H02J 13/00016* (2020.01); *G05B 13/041* (2013.01); *H02J 3/00* (2013.01);
(Continued)

(58) Field of Classification Search
CPC .......... H02J 13/00016; H02J 13/00007; H02J 13/00034; H02J 3/00; H02J 2203/20;
(Continued)

(56) References Cited

U.S. PATENT DOCUMENTS 8,756,047 B2 * 6/2014 Patel .................. H02J 3/06
706/16
10,530,184 B2   1/2020 Dam
(Continued)

OTHER PUBLICATIONS

U.S. Appl. No. 15/629,950, Notice of Allowance dated Sep. 9, 2019, 10 pages.
(Continued)

*Primary Examiner* — Kibrom K Gebresilassie
(74) *Attorney, Agent, or Firm* — Kilpatrick Townsend & Stockton LLP

(57) ABSTRACT

This disclosure involves verifying that a power network model corresponds to an electric power network providing electrical power in a geographical area. For instance, a validation device computes a validation score for a power network model based on a connectivity score, an asset score, and a power-flow score. The connectivity score indicates connectivity errors in the power network model as compared to the power network. The asset score indicates power-delivery errors in the power network model with respect to power-consuming assets serviced by the power network. The power-flow score indicates power-flow calculation errors in the power network model with respect to voltage ranges for the power network. The validation score is repeatedly computed for iteratively updated versions of the power network model until a threshold validation score is obtained. The validated power network model is provided to a control system for identifying and correcting errors in the power network.

20 Claims, 7 Drawing Sheets

Related U.S. Application Data continuation of application No. 15/629,950, filed on Jun. 22, 2017, now Pat. No. 10,530,184.

(60) Provisional application No. 62/353,801, filed on Jun. 23, 2016.

(51) Int. Cl.
  *G05B 13/04* (2006.01)
  *H02J 3/00* (2006.01)
(52) U.S. Cl.
  CPC .. *H02J 13/00007* (2020.01); *H02J 13/00034* (2020.01); *H02J 3/06* (2013.01); *H02J 2203/20* (2020.01); *Y02E 60/00* (2013.01); *Y04S 10/50* (2013.01); *Y04S 40/124* (2013.01); *Y04S 40/20* (2013.01)
(58) Field of Classification Search
  CPC .......... H02J 3/06; G05B 13/041; Y02E 60/00; Y04S 10/50; Y04S 40/124; Y04S 40/20
  See application file for complete search history.

(56) References Cited

U.S. PATENT DOCUMENTS

| | | | |
|---|---|---|---|
| 11,100,643 | B2 | 8/2021 | Yang et al. |
| 2006/0211444 | A1* | 9/2006 | Koike ............... H04W 48/18 455/456.1 |
| 2011/0196546 | A1 | 8/2011 | Muller et al. |
| 2012/0185804 | A1 | 7/2012 | Dam |
| 2014/0108094 | A1 | 4/2014 | Beddo et al. |
| 2016/0190861 | A1* | 6/2016 | Cha ........................ H02J 7/00 320/108 |
| 2017/0373535 | A1 | 12/2017 | Dam |
| 2020/0106300 | A1 | 4/2020 | Dam |
| 2022/0012024 | A1 | 1/2022 | Grigore |

OTHER PUBLICATIONS

U.S. Appl. No. 16/701,425, Notice of Allowance dated Feb. 4, 2022, 10 pages.
U.S. Appl. No. 16/701,425, Non-Final Office Action dated Aug. 27, 2021, 22 pages.

\* cited by examiner

FIG. 3

VALIDATING POWER NETWORK MODELS FOR MONITORING AND CORRECTING OPERATION OF ELECTRIC POWER NETWORKS

CROSS-REFERENCE TO RELATED APPLICATION

This is a continuation of U.S. patent application Ser. No. 16/701,425 entitled "Validating Power Network Models for Monitoring and Correcting Operation of Electric Power Networks," filed Dec. 3, 2019, now U.S. Pat. No. 11,349,338 issued May 31, 2022, which is a continuation of U.S. patent application Ser. No. 15/629,950 entitled "Validating Power Network Models for Monitoring and Correcting Operation of Electric Power Networks," filed Jun. 22, 2017, now U.S. Pat. No. 10,530,184 issued Jan. 7, 2020, which claims priority to U.S. Provisional Application No. 62/353,801, entitled "Validating Electric Power Network Models," filed Jun. 23, 2016, the contents of which are incorporated herein by reference.

TECHNICAL FIELD

This disclosure relates generally to apparatuses and processes for modeling and reproducing an electrical system to predict its performance and thereby configure the electrical system to obtain a desired performance. More particularly this disclosure relates to using validation scores or other quantitative measures to verify that a power network model corresponds to an electric power network and is therefore usable for controlling operation of the electrical power network.

BACKGROUND

Electric power networks, such as power grids or other power distribution systems, are used to deliver power from power sources (e.g., power stations and other electrical providers) through a network of switches, transformers, and other delivery infrastructure to load devices located in dwellings and other buildings or geographic areas. Power grid models or other power network models are computer representations of real power grids. Power grid models or other power network models are used in one or more of Advanced Grid Analytics software, power systems simulation and planning software, and in Distribution Management System ("DMS") or Energy Management System ("EMS") applications used by utility operations centers.

Various types of data can be used to generate power network models. Examples of this data include geographic information system ("GIS") layout data, connectivity data, and device information data. The data involved in different aspects of power network models are typically managed using human input. Thus, the data used to generate power network models is prone to errors, inconsistencies, and incompleteness.

SUMMARY

Aspects and examples are disclosed for validating a power network model by verifying that the model matches or otherwise corresponds to an electric power network providing electrical power to multiple assets positioned in a geographical area. For instance, a validation device computes a validation score for a power network model based on a connectivity score, an asset score, and a power-flow score. The connectivity score indicates connectivity errors in the power network model as compared to the power network. The asset score indicates power-delivery-attribute errors in the power network model with respect to power-consuming assets serviced by the power network. The power-flow score indicates power-flow calculation errors in the power network model with respect to voltage ranges specified for the power network. The validation score is repeatedly computed for iteratively updated version of the power network model until a threshold validation score is reached (i.e., the model is validated). The validated power network model is provided to a control system for identifying and correcting errors in the power network.

These illustrative aspects and features are mentioned not to limit or define the invention, but to provide examples to aid understanding of the inventive concepts disclosed in this application. Other aspects, advantages, and features of the present invention will become apparent after review of the entire application.

BRIEF DESCRIPTION OF THE FIGURES

These and other features, aspects, and advantages of the present disclosure are better understood when the following Detailed Description is read with reference to the accompanying drawings.

FIG. 3 depicts an example of a user interface used by a validation application to display results and other output data generated by validating power network models.

DETAILED DESCRIPTION

Figure 1:
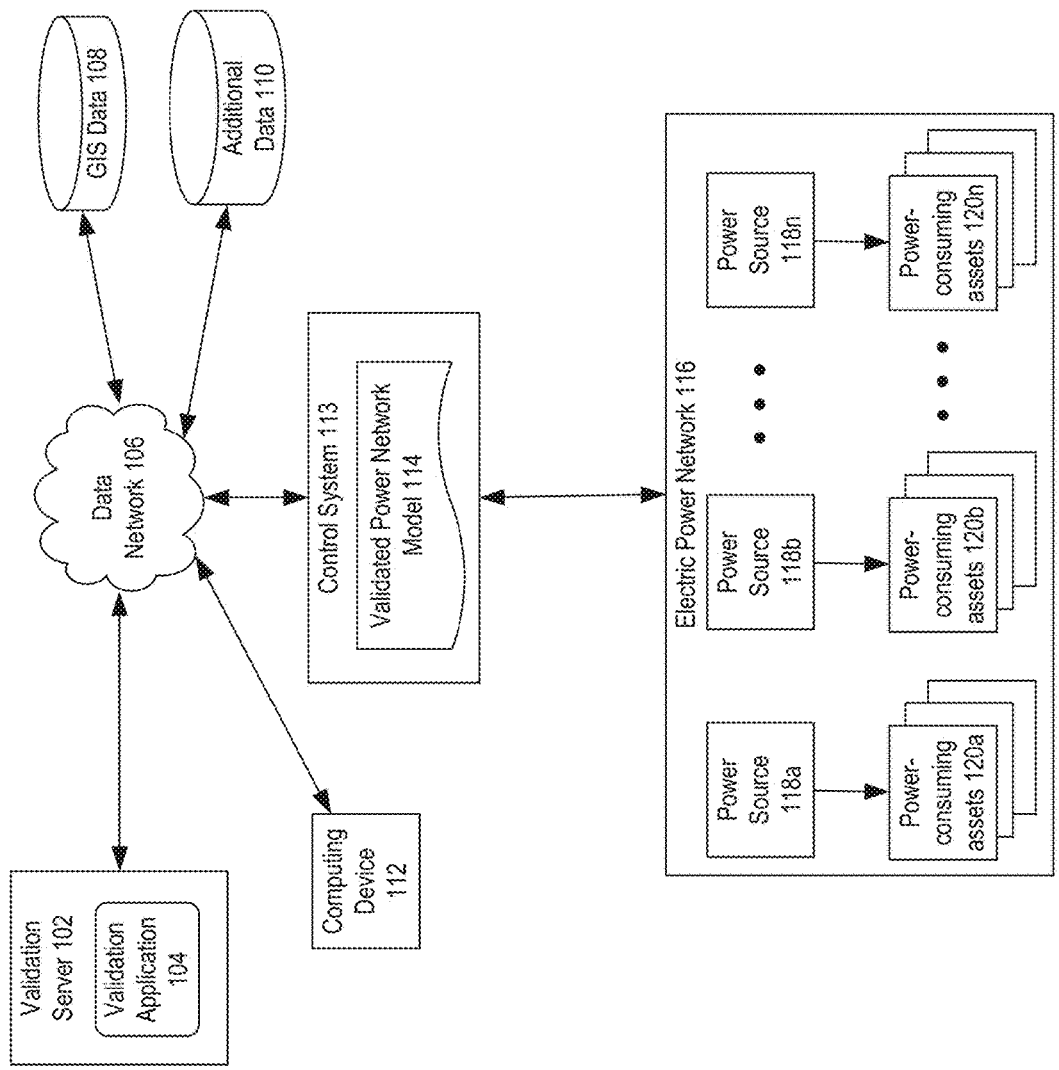
FIG. 1 is a block diagram illustrating an example of a system for validating power network models.

Systems and methods are provided for validating a power network model by verifying that the model matches or otherwise corresponds to an electric power network providing electrical power to multiple assets positioned in a geographical area. For example, a validation server defines and computes one or more validation scores or other metrics indicating a quality of a power network model used by a control system of an electric power network. The validation server can calculate one or more validation scores indicating the quality of a power network model. The validation score can be computed after performing, under a number of assumptions, topological and quantitative (e.g., power flow) analysis of a power grid model or other power network model. The calculated validation score is used to assess both content quality and execution results of power network models. If the power network model has been validated, the power network model is more effective for diagnosing and correcting errors in an electric power network that corresponds to the power network model.

Validating the power network model can include, for example, verifying that the power network model accurately reflects the actual elements and connections in the corresponding electric power network. In some aspects, the validation scores indicate that planning and optimization of a power network model can be reasonably performed. An optimized power network model can be used to improve the efficiency, reliability, or other performance characteristics of an electric power network that corresponds to the power network model. For instance, optimizing an electric power network can reduce outages in the network. Certain types of optimization software cannot be properly used to optimize a power network model if the power network model has a low quality. The validation scores described herein can ensure that a model has a sufficiently high quality level for use by optimization and analytics software.

In some aspects, the power network model-validation features provided by the analytical application can provide engineers with a validation score indicating whether a power network model is well-formed enough for power flow calculations and other analytics to be performed on the power network model. In additional or alternative aspects, the validation scores can allow personnel without in-depth technical knowledge of electric power networks (e.g., executives, sales and project managers, etc.) to understand how accurate a power network model is.

Certain aspects described herein are applied to the operation of electric power networks and thereby improve modeling systems, control systems, or both that are used to control how electric power networks are configured. In particular, certain validation systems and methods described herein improve existing control systems by improving the accuracy with which a particular model reflects the devices, connections, and power flow in an electric power network. For example, existing systems lack any algorithm for computing separate scores that evaluate different aspects of a power network model (e.g., connectivity, assets, and power flow). By contrast, certain implementations described herein provide a specific validation algorithm that evaluates an overall quality of the model (e.g., the validation score) while also providing more granular evaluations of certain features of the model that are particular to electric power networks (e.g., connectivity, power flow, etc.). Furthermore, in conventional control systems that rely on un-validated power network models, errors in the power network model can lead to sub-optimal or improper operation of the modeled power network. Thus, in contrast to conventional control systems, a control system that uses a validated power control model can more effectively manage electric power networks to improve efficiency of power delivery, address sub-optimal performance, etc.

FIG. 1 is a block diagram illustrating an example of a system that includes a validation server 102 for validating power network models. The system includes the validation server 102, which can execute a validation application 104, one or more computing devices 112, a control system 113, and an electric power network 116 that corresponds to the power network model being analyzed and validated by the validation application 104. The validation server 102, the computing device 112, the control system 113, and various data sources such as GIS data 108 and additional data 110 are communicatively coupled via a data network 106.

The validation server 102 can access one or more data sources via a data network 106. Examples of data sources include databases or other data structures from which GIS data 108 and additional data 110 can be retrieved. In some embodiments, the GIS data 108, the additional data 110, or both include connectivity data (e.g., nodes and edges of a power network). The validation application 104 can validate, generate, modify, or otherwise use power network models based on one or more of the GIS data 108 and the additional data 110. The validation application 104 can also validate one or more power network models that are generated or modified based on one or more of the GIS data 108 and the additional data 110. The validation application 104 can configure the validation server 102 to provide output data, which represents the results of the power network model validation, to the computing device 112 via the data network 106.

The control system 113 can be communicatively coupled to one or more devices in the electric power network 116. The control system 113 stores (or otherwise has access to) one or more validated power network models 114. The control system 113 uses a validated power network model 114 to identify errors, inefficiencies, or other issues in the electric power network 116. For example, the control system 113 may execute diagnostic software or another control service, such as Advanced Grid Analytics software, that uses the validated power network model 114 to develop plans for optimizing the electric power network 116. The diagnostic software or another control service predicts (or otherwise analyzes) the behavior of the electric power network 116.

For instance, the electric power network 116 can include one or more power sources 118a-n and various sets of power-consuming assets 120a-n. The validated power network model 114 can include modeled nodes corresponding to the power sources 118a-n and the power-consuming assets 120a-n, as well as modeled links corresponding to connections among the power sources 118a-n and the power-consuming assets 120a-n. The validated power network model 114 can be used to identify, for example, a sub-optimal performance of power source 118b in providing power to the power-consuming assets 120b. Based on this identification, the control system 113 can modify one or more configuration parameters of the electric power network 116.

The control system 113 can operated more effectively when using a validated network model 114. For instance, the increased accuracy of the validated network model 114 can provide more reliable calculations or simulations of actual and fictional operation conditions of the physical power network counterpart (i.e., the electric power network 116 that is modeled by the validated network model 114). In one example, the validation process can identify incorrectly entered data in systems such as the GIS data 108, such as power grid assets reported at an incorrect location, assets attributes (e.g. power and voltage ratings) incorrectly entered, etc. In another example, a control system 113 that executes Advanced Grid Analytics and other smart grid software can use a validated network model to accurately identify ways to optimize power grid operations. Examples of these optimization include options for shifting power usage away from overloaded assets, identification of various usage patterns on each physical conductor in the electric grid, and recommendations for equipment upgrades and other improvements to the physical implementation of the electric power network 116. By contrast, a power network model with validation errors would lead to erroneous outputs by Advanced Grid Analytics software or other power grid software used by the control system 113, which could potentially result in hazardous power grid operating conditions.

For illustrative purposes, FIG. 1 depicts the validation application 104 being executed on a validation server 102.

However, other implementations are possible. For example, in some embodiments, a validation application 104 as described herein can be executed on a computing system other than a server, such as a laptop or other end-user computing device.

Figure 2:
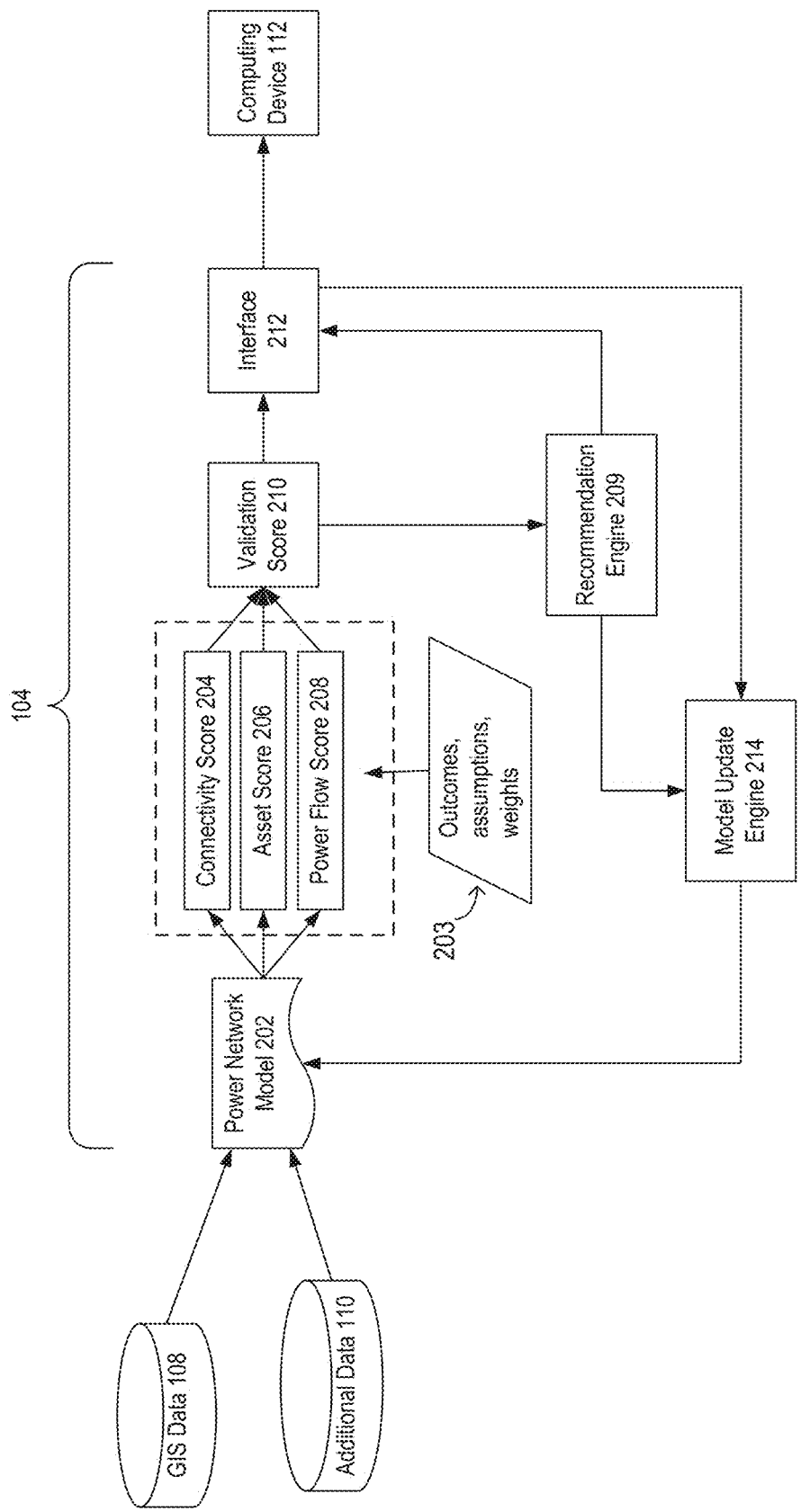
FIG. 2 is a block diagram illustrating an example of a data flow used by the system of FIG. 1 to validate power network models.

FIG. 2 is a block diagram illustrating an example of a data flow used by the validation application 104 to validate one or more power network models 202. In this example, the validation application 104 can generate or modify one or more power network models 202 based on data describing various elements of an electric power network. Examples of data describing various elements of an electric power network include the GIS data 108 and the additional data 110. The validation application 104 can communicate with data sources such as GIS databases or planning software (e.g., Cyme) maintained by utility providers. The validation application 104 can extract relevant GIS data 108, relevant additional data 110, or both from these data sources. The validation application 104 can generate or modify a database or other file that stores records and data values corresponding to the power network model 202.

The validation application 104 can validate the power network model 202 for use by Advanced Grid Analytics software or other suitable applications executed by a control system 113. For example, the validation application 104 can compute different component scores for different aspects of a given power network model 202 using parameters 203. The parameters 203 can include one or more adjustable outcomes, assumptions, weights, or some combination thereof. Examples of the component scores include a connectivity score 204, a power-flow score 208, and an asset score 206. The connectivity score 204 corresponds to connectivity issues, and can indicate connectivity errors in the power network model 202 as compared to the electric power network 116. The asset score 206 corresponds to device issues, and can indicate power-delivery attribute errors in the power network model 202 with respect to power-consuming assets 120a-n serviced by the electric power network 116. The power-flow score 208 corresponds to power-flow calculation issues, and can indicate power-flow calculation errors in the power network model 202 with respect to voltage ranges or other power-flow attributes specified for the electric power network 116. The validation application 104 can compute a validation score 210 for the power network model 202 based on one or more of these component scores.

In some aspects, the validation application 104 can calculate the various scores after performing topological and quantitative analysis of a power network model 202 under a number of assumptions. For example, the connectivity score 204 can be computed based on an analysis of which elements in power network model 202 are connected to one another, as determined from the GIS data 108 or additional data 110. The validation application 104 can generate a data graph of the power network model 202, where each node is a point of the electric power network and each edge is a connection (a line, switch, etc.) between two nodes. The nodes and connections can be identified in the GIS data 108 or additional data 110. The connectivity score 204 increases if, for example, fewer topological islands or connectivity islands (i.e., sets of nodes and edges that are not connected to some nodes or edges) exist in the data graph.

The validation application 104 can also calculate a validation score 210 (e.g., a global score or overall model health score) for display on an interface 212 using some combination of the connectivity score 204, the power-flow score 208, and the asset score 206. In some aspects, the validation score 210 is an overall model score that is the weighted sum of the connectivity score 204, the power-flow score 208, and the asset score 206. The validation score 210 can indicate the quality of the power network model 202. For example, a higher validation score 210 can indicate a higher quality of the power network model data in the power network model 202.

In some aspects, the validation application 104 can include a recommendation engine 209, as depicted in the example of FIG. 2. The recommendation engine 209 includes executable program code for analyzing the power network model 202. The recommendation engine 209 can identify, based on this analysis, one or more potential sources of error that contribute to a lower validation score 210. The recommendation engine 209 can generate one or more suggested modifications for addressing the potential sources of error identified from the analysis.

In some aspects, the recommendation engine 209 can present one or more recommendations via the interface 212 for acceptance by a user. For instance, a recommendation can be presented via the interface 212. If user input accepting the recommendation is received via the interface 212, the validation application 104 can execute a model update engine 214, as indicated by the arrow from the interface 212 to the model update engine 214. The model update engine 214 includes executable program code for modifying the power network model 202 in accordance with one or more accepted recommendations. In other aspects, the recommendation engine 209 can cause the model update engine 214 to implement a suggested modification without requiring an acceptance input from the interface 212, as indicated by the arrow from the recommendation engine 209 to the model update engine 214. In various aspects involving the model update engine 214, the updated power network model 202 can be revalidated by computing an updated validation score 210 for the power network model 202 as modified using the model update engine 214. The updated power network model 202 can have improved validation scores over a previous version of the power network model 202.

The connectivity score 204, the power-flow score 208, and the asset score 206 can be computed based on one or multiple configurable charts stored in a non-transitory computer-readable medium and accessible to the validation application 104. Each chart can include conditions, rules, or other schema under which points are attributed to certain features of the power network model 202. In some aspects, these conditions, rules, or other schema can involve simple record checking. In additional or alternative aspects, these conditions, rules, or other schema can involve the use of advanced proprietary algorithms (e.g., a power flow engine, a graph processor, fuzzy logic, etc.). Scoring charts with conditions, rules, or other schema may vary with time, customers, or versions/functionality of any software used with a power network model.

Examples of Devices for Validating Power Network Models

Figure 4:
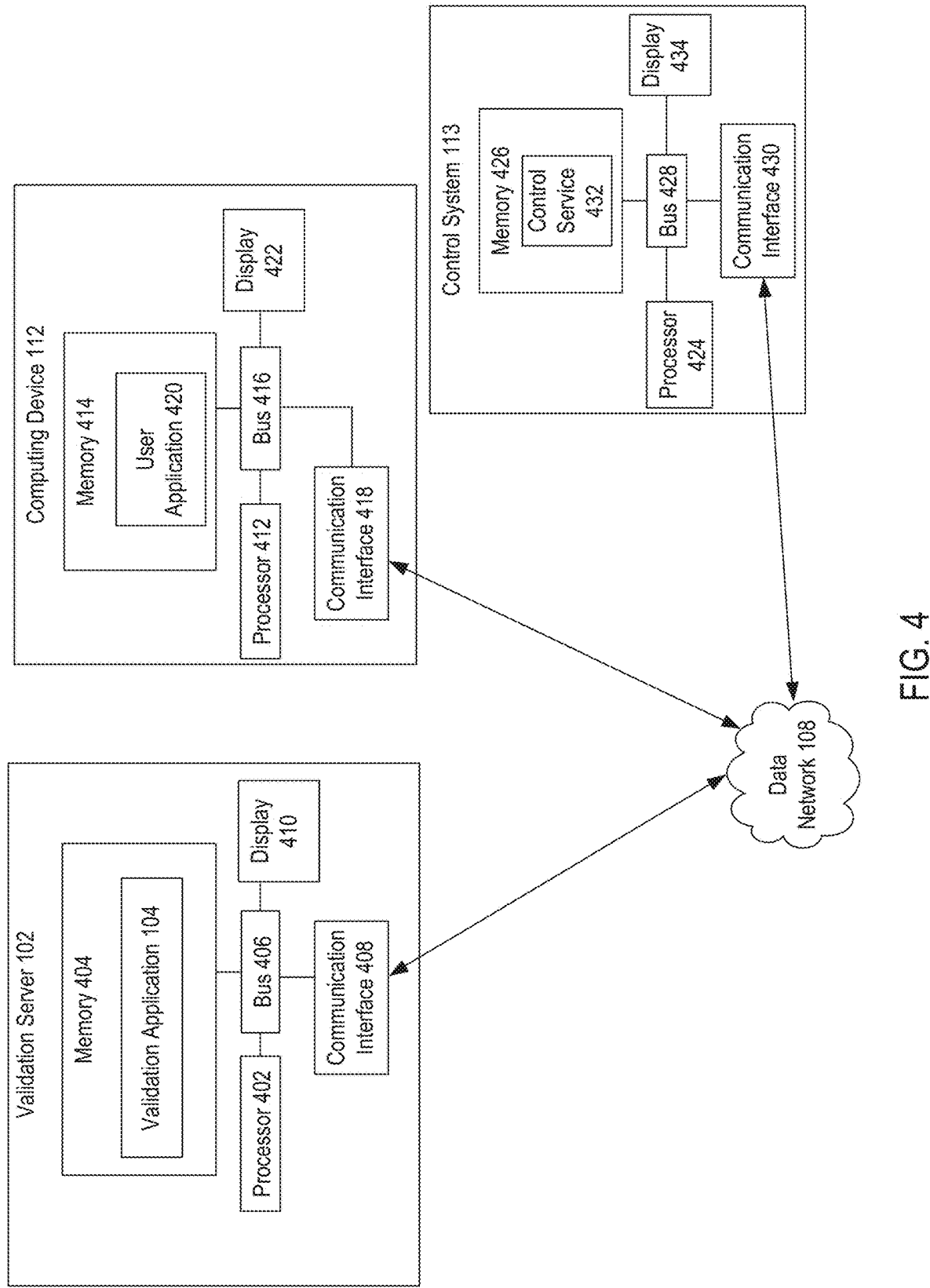
FIG. 4 is a block diagram depicting examples of devices used to validate power network models.

FIG. 4 is a block diagram depicting examples of implementations for devices used to validate power network models. The validation server 102 (or other suitable computing system executing the validation application 104), the computing device 112, and the control system 113 can respectively include processors 402, 412, 424. Non-limiting examples of the processors 402, 412, 424 include a microprocessor, a field-programmable gate array ("FPGA") an application-specific integrated circuit ("ASIC"), or other suitable processing devices. Each of the processors 402, 412, 424 can include any number of processing devices, including one. The processors 402, 412, 424 can be communicatively coupled to computer-readable media, such as memory devices 404, 414, 426.

One or both of the memory devices 404, 414, 426 can store program code that, when executed by the processors 402, 412, 424, causes a respective one of the processors 402, 412, 424 to perform operations described herein. The program code may include processor-specific program code generated by a compiler and/or an interpreter from code written in any suitable computer-programming language. Non-limiting examples of suitable computer-programming languages include C, C++, C#, Visual Basic, Java, Python, Perl, JavaScript, ActionScript, and the like.

One example of the program code is the validation application 104 stored in the memory device 404. Another example of the program code is a user application 420 stored in the memory device 414. When executed, the user application 420 can communicate with the validation application 104 and display the interface 212. Another example of the program code is a control service 432 stored in the memory device 426. When executed, the user application 420 can communicate with the validation application 104, obtain a validated power network model, and use the validated power network model to identify and correct errors and other issues with respect to an electric power network 116.

Each of the memory devices 404, 414, 426 may include one or more non-transitory computer-readable media such as (but not limited to) an electronic, optical, magnetic, or other storage device capable of providing a processor with computer-readable instructions. Non-limiting examples of such optical, magnetic, or other storage devices include read-only ("ROM") devices, random-access memory ("RAM") devices, magnetic disks, magnetic tapes or other magnetic storage, memory chips, an ASIC, configured processors, optical storage devices, or any other medium from which a computer processor can read program code.

In the example depicted in FIG. 4, the validation server 102, the computing device 112, and the control system 113 respectively include buses 406, 416, 428. Each of the buses 406, 416, 428 can communicatively couple one or more components of a respective one of the validation server 102 and the computing device 112. Each of the buses 406, 416, 428 can communicate input events and output events among components of the validation server 102, the computing device 112, and the control system 113, respectively. For example, the validation server 102 can include one or more input devices and one or more output devices, such as a display device 410. The computing device 112 can also include one or more input devices and one or more output devices, such as a display device 422 for displaying a graphical interface provided by the validation application 104 or generated using data received from the validation application 104. The computing device 112 can also include one or more input devices and one or more output devices, such as a display device 434 for displaying a graphical interface used to control or adjust various aspects of the electric power network 116. Input devices and output devices can be communicatively coupled via buses 406, 416, 428. The communicative coupling can be implemented via any suitable manner (e.g., a connection via a printed circuit board, connection via a cable, communication via wireless transmissions, etc.). Non-limiting examples of display devices 410, 422, 434 include an LCD screen, an external monitor, a speaker, or any other device that can be used to display or otherwise present outputs generated by a validation server 102, a user application 420, or a control service 432.

Although the processors 402, 412, 424, the memory devices 404, 414, 426, and the buses 406, 416, 428 are respectively depicted in FIG. 4 as separate components in communication with one another, other implementations are possible. For example, the processors 402, 412, 424, the memory devices 404, 414, 426, and the buses 406, 416, 428 can be respective components of respective printed circuit boards or other suitable devices that can be included in one or more of the validation server 102, the computing device 112, and the control system 113.

The validation server 102 and the computing device 112 can also include respective communication interfaces 408, 418, 430. Each of the communication interfaces 408, 418, 430 includes any device or group of devices suitable for establishing a wired or wireless data connection to one or more data networks. Non-limiting examples of the communication interfaces 408, 418, 430 include Ethernet network adapters, modems, etc.

Examples of Computing a Validation Score

Figure 5:
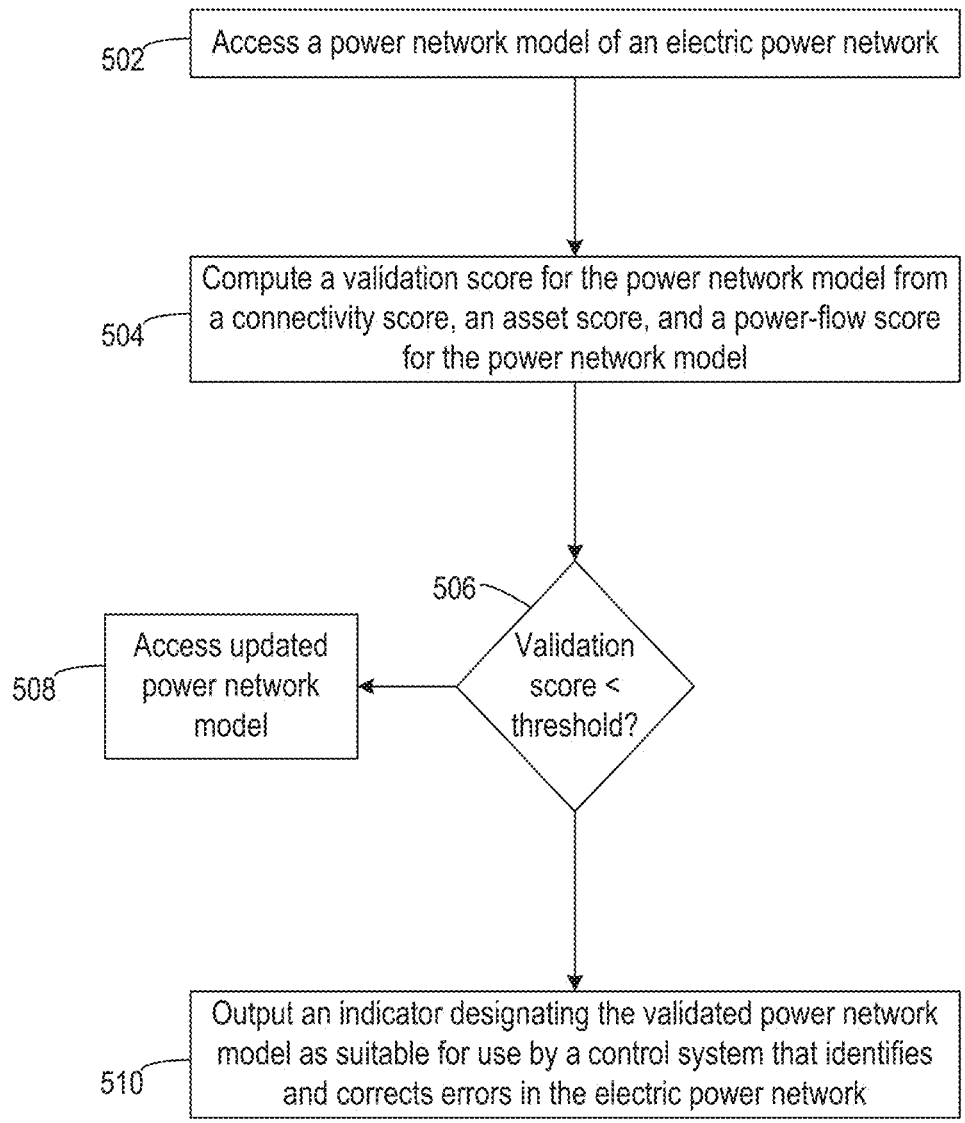
FIG. 5 is a flow chart depicting an example of a method for validating a power network model by verifying that the power network model matches an electric power network.

FIG. 5 is a flow chart depicting an example of a method 500 for using the validation application 104 to validate a power network model 202 by verifying that the power network model 202 matches an electric power network 116. For illustrative purposes, the method 500 is described with reference to one or more of the examples described above with respect to FIGS. 1-4. Other implementations, however, are possible.

The method 500 involves accessing the power network model, wherein the power network model is generated from data stored in a geographic information system database and describing assets and power stations of the electric power network, as shown in block 502. One or more suitable processing devices 402 of a validation server 102 can implement block 502 by executing program code that includes the validation application 104. In some aspects, the executed validation application 104 configures the validation server 102 to retrieve the power network model 202 from a non-transitory computer-readable medium, such as the memory device 404 of the validation server 102. In other aspects, the executed validation application 104 configures the validation server 102 to receive the power network model 202 from a non-transitory computer-readable medium, such as the memory device 414 of the computing device 112, via communications over a data network 106. In other aspects, the executed validation application 104 configures the validation server 102 to receive the power network model 202 from a non-transitory computer-readable medium, such as the memory device 426 of the control system 113, via communications over the data network 106.

The method 500 also involves computing a validation score for the power network model from a combination of a connectivity score, an asset score, and a power flow score, as shown in block 504. One or more suitable processing devices 402 of a validation server 102 can implement block 504 by executing program code that includes the validation application 104. The executed validation application 104 configures the validation server 102 to compute each of the component scores (i.e., the connectivity score 204, the power-flow score 208, the asset score 206). Examples of computing some of these scores are described herein with respect to FIGS. 6 and 7. The validation application 104 computes the validation score 210 from a combination of these component scores.

The validation application 104 can use any suitable scale (e.g., a percentage) for the validation score 210. The validation application 104 can compute the validation score 210 as a weighted sum of the connectivity score 204, the power-flow score 208, the asset score 206, and any other scores that may be used. A maximum score can be achievable in each category. A maximum global score can also be achievable.

In one example, a validation score S (e.g., an overall "health score") for a power network model can be defined as:

$$S = w_C S_c + w_A S_A w_P S_P. \quad (1)$$

In equation 1, the connectivity weight $w_C$ represents the weight applied to the connectivity score $S_c$ in the computation of the global score. The asset weight $W_A$ represents the weight applied to the asset score $S_A$ in the computation of the global score. The power flow weight $w_P$ represents the weight applied to the power-flow score $S_P$ in the computation of the global score.

In one example, the validation application 104 can compute or otherwise obtain, for a particular power network model, a connectivity score of $S_c$=85%, an asset score of $S_A$=72%, and a power-flow score of $S_P$=940 out of 1200. The validation application 104 can retrieve weights for these scores from a non-transitory computer-readable medium. Examples of the weights include a connectivity weight $w_C$=5, an asset weight $w_A$=8, and a power flow weight $w_P$=1. The power network model health score S computed with equation 1 is S=5×85+8×72+940=1941, out of a maximum score of 2500.

In various aspects, each component score (i.e., connectivity score, asset score, and power-flow score) and the power network model health score are defined to meet the specific criteria for a particular model. These criteria can be provided by data consulting services, utility engineers, or other suitable personnel and stored in a non-transitory computer-readable medium. Examples of the criteria include the weights described above and extreme values (i.e., minimum values, maximum values, or both) achievable for each type of score.

The method 500 also involves determining whether the validation score is below a threshold validation score, as shown in block 506. One or more suitable processing devices 402 of a validation server 102 can implement block 506 by executing program code that includes the validation application 104. The executed validation application 104 configures the validation server 102 to retrieve the threshold validation score from a non-transitory computer-readable medium, such as the memory 404 of the validation server 102. The validation application 104 can compare the threshold validation score with the validation score computed at block 504.

The validation server 102 can obtain the threshold validation score in any suitable manner. In some aspects, the validation server 102 can receive input (e.g., via a graphical interface for accessing the validation application 104) from a computing device 112 via a data network 106. The input can include a user-specified threshold validation score for the power network model 202. The threshold validation score can be obtained from (or based on) specifications provided from an expert or other suitable user. An example of a threshold validation score is a minimum score indicating whether the power network model 202 is well-formed enough to be used for performing power flow calculations or other analyses on the power network model 202.

If the validation score is below a threshold validation score, the method 500 proceeds to block 508, which involves accessing an updated version of the power network model. One or more suitable processing devices 402 of a validation server 102 can implement block 508 by executing program code that includes the validation application 104. The executed validation application 104 configures the validation server 102 to access an updated version of the power network model 202. In some aspects, the updated version of the power network model 202 is created based on one or more modifications to the power network model 202, where the modifications are specified via one or more users received at the computing device 112 and transmitted to the validation server 102. In additional or alternative aspects, the updated version of the power network model 202 is created based on one or more modifications to the power network model 202, where the modifications are generated at least in part based on the validation application 104 identifying one or more potential solutions to errors in the power network model 104.

For instance, the validation application 104 can generate and output a recommendation for modifying the power network model. The modification can be recommended to resolve one or more modeling errors indicated by the validation score 210 or by one or more of the component scores. As an example, the validation application 104 can determine that a particular component score (e.g., the connectivity score 204) is more heavily weighted than one or more other component scores. The validation application 104 can analyze the power network model 202 to identify one or more issues that resulted in the heavily weighted component score (e.g., connectivity issues, such as an excessive number of islands). The validation application 104 can generate a recommended solution to the identified issues. Examples of recommended solutions include changing certain asset attributes (e.g., one or more attribute values affecting power flow scores), moving assets within the power network model 202, adding assets to the power network model 202, deleting assets from the power network model 202, and changing connections among assets within the power network model 202 (e.g., connecting assets to assets other than assets originally connected).

The validation application 104 can output the recommendation by, for example, displaying the recommendation on a graphical interface at the display device 410 or transmitting the recommendation to a computing device 112 for display on a graphical interface at the display device 422. The graphical interface may include an option for a user to accept the recommendation. If the validation application 104 receives a user input indicating acceptance of the recommendation, the validation application 104 (or another application in communication with the validation application 104) can modify the power network model 202 in accordance with the recommendation. The modified power network model 202 can be accessed at block 508 of the method 500.

In another example, the validation application 104 (or another application in communication with the validation application 104) can automatically apply one or more modifications without receiving user input (e.g., input that selects a modification or accepts a recommendation regarding a modification). For instance, if a potential solution to a model error is identified, the validation server 102 can implement the solution automatically and generate an updated version of the power network model 202. The modified power network model 202 can be accessed at block 508 of the method 500.

If the validation score is greater than or equal to the threshold validation score, the method 500 proceeds to block 510, which involves outputting an indicator that the validated power network model is suitable for use by a control system 113. For example the indicator, which can be transmitted to a control system 113 or presented via the user interface 212, can designate the validated power network model 202 as suitable for further use by Advanced Grid Analytics software, DMD, EMS, or other power grid software that may be executed by a control system 113. Examples of the indicator include the validation score itself, a color-coded indicator (e.g., a green highlight or text for the validation score), or a message stating that the power network model 202 is error-free or has otherwise passed validation.

In some aspects, the validation server 102 can output the validated power network model to a control system 112 that identifies and corrects errors in the electric power network. One or more suitable processing devices 402 of a validation server 102 can implement block 510 by executing program code that includes the validation application 104. The executed validation application 104 configures the validation server 102 to output the power network model 202. For example, the validation server 102 can transmit the power network model 202 to the control system 113, which can store the validated power network model 202 in the memory 426.

The control service 432 can access the validated power network model 202 to identify one or more errors in the operation of the electric power network 116. The control service 432 can correct the identified errors by, for example, changing a configuration of the electric power network 116. Using a validated network model allows the control system 113, which executes Advanced Grid Analytics and other smart grid software, to accurately identify ways to optimize power grid operations, such as identifying ways to shift power usage away from overloaded assets, reporting various usage patterns on each physical conductor in the electric grid, and recommending equipment upgrades and other equipment changes.

Connectivity Score Example

Figure 6:
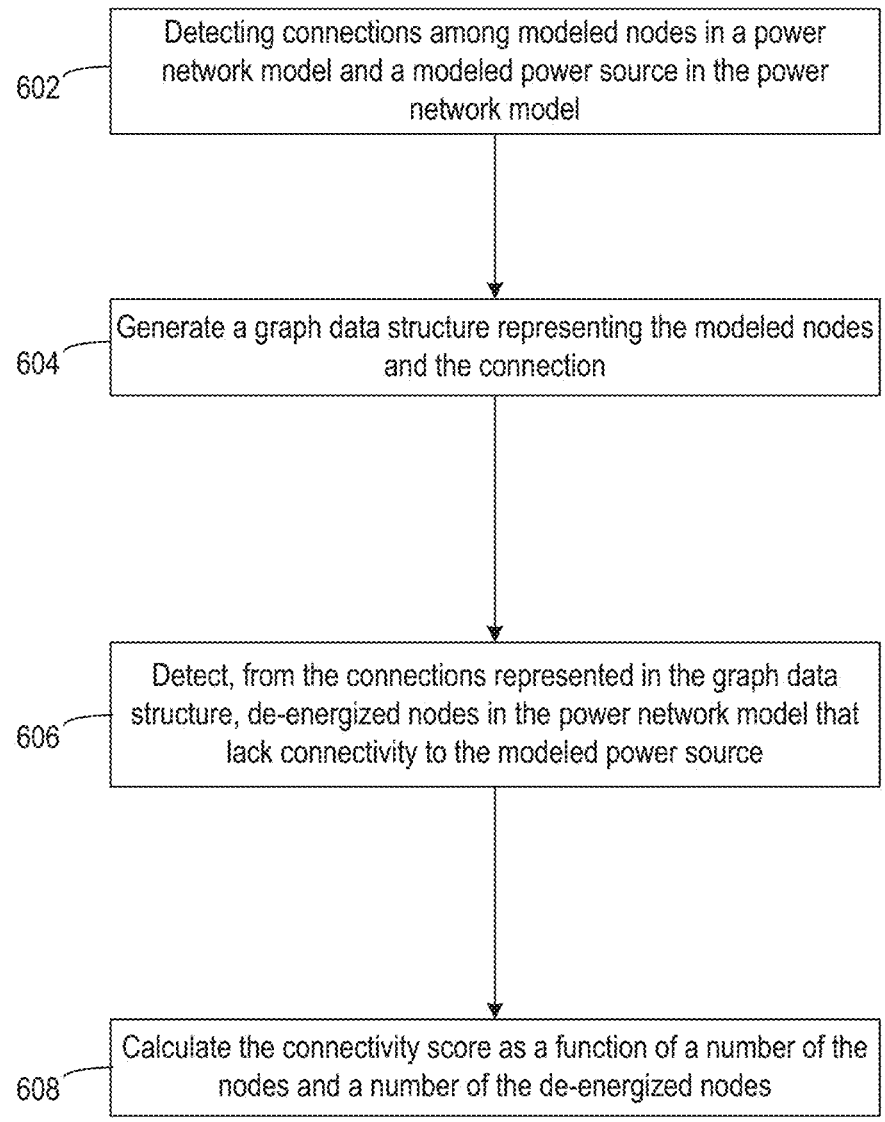
FIG. 6 is a flow chart depicting an example of a method for using the validation application to compute a connectivity score for a power network model.

FIG. 6 is a flow chart depicting an example of a method 600 for using the validation application 104 to compute a connectivity score for a power network model 202. For illustrative purposes, the method 600 is described with reference to one or more of the examples described above with respect to FIGS. 1-5. Other implementations, however, are possible.

The method 600 involves detecting connections among modeled nodes in the power network model and a modeled power source in the power network model, as shown in block 602. One or more suitable processing devices 402 of a validation server 102 can implement block 602 by executing program code that includes the validation application 104. The executed validation application 104 configures the validation server 102 to access the power network model 202, the GIS data 108, the additional data 110, or some combination thereof. The validation application 104 further configures the validation server 102 to determine, based on this accessed data, which elements in the power network model 202 are connected to one another.

The method 600 also involves generating a graph data structure representing the power network modeled nodes and the connection, as shown in block 604. One or more suitable processing devices 402 of a validation server 102 can implement block 604 by executing program code that includes the validation application 104. The executed validation application 104 configures the validation server 102 to generate a data graph of the power network model 202. The generated data graph includes graph nodes representing modeled nodes from the power network model 202 (e.g., nodes representing points in the electric power network 116, such as power sources 118a-n, power consuming devices 120a-n, or both). In the data graph, each edge between graph nodes represents a connection (a line, switch, etc.) between two modeled nodes from the power network model 202. The nodes and connections can be identified from the GIS data 108 or additional data 110. The processing device 402 can store the graph data structure in a suitable non-transitory computer-readable medium, such as the memory 404.

The method 600 also involves detecting, from the connections represented in the graph data structure, de-energized nodes in the power network model that lack connectivity to the power network modeled power source, as shown in block 606. One or more suitable processing devices 402 of a validation server 102 can implement block 606 by executing program code that includes the validation application 104. The executed validation application 104 configures the validation server 102 to detect the de-energized nodes (e.g., connectivity islands). The validation application 104 can detect the de-energized nodes based on determining that some of the nodes lack connectivity to a power source in the power network model 202.

The method 600 also involves calculating the connectivity score as a function of a number of the nodes and a number of the de-energized nodes, as shown in block 608. One or more suitable processing devices 402 of a validation server 102 can implement block 608 by executing program code that includes the validation application 104. The executed validation application 104 configures the validation server 102 to compute the connectivity score. An increase in the number of the de-energized nodes causes the connectivity score to indicate increased connectivity errors (e.g., by decreasing the connectivity score computed by the function).

The connectivity score 204 can be computed based on various attributes reflective of connectivity in a modeled electric power network. Examples of attributes used to compute the connectivity score 204 include a number of topological islands, a number of consumers, a number of transformers, the total installed power, a number of energized islands, a number of de-energized islands, a number of nodes on energized or de-energized islands, a number of energized or de-energized consumers, a distribution of transformers, installed power in energized and de-energized islands, a size and installed power of the largest energized and de-energized islands, installed generation capacity, and availability of island fixes that can be determined or applied automatically. The validation application 104 can compute the connectivity score 204 from some or all of these attributes.

In one example, the validation application 104 computes a connectivity score $S_c$ using the following formula:

$$S_c = \frac{n_{node} - n_u - n_z/2}{n_{node}}. \tag{2}$$

In equation 2, the term $n_{node}$ represents a number of nodes (or buses) in the power network model 202 being validated. The term $n_u$ represents a number of nodes that are not energized. The term $n_z$ represents a number of nodes that are not energized and that are on islands without consumers. In this example, equation 2 emphasizes the number of connected nodes. For instance, a larger number of non-energized nodes results in a lower connectivity score 204. Equation 2 emphasizes customer connectivity. For instance, the number of nodes in non-energized islands with customers causes a greater decrease in the connectivity score 204 as compared to the number of nodes in non-energized islands without customers.

In one example, the validation application 104 accesses a model of a power distribution network with $n_{node}$=10000 nodes. The validation application 104 computes a graph representing interconnections among these nodes. The validation application 104 analyzes the graph and thereby determines that $n_u$=1500 nodes are not energized. The validation application 104 also determines, from the graph analysis, that of the non-energized nodes are on islands with no consumers ($n_z$=500). The validation application 104 uses these values and equation 2 to compute a connectivity percentage score $$S_c = \frac{10000 - 1500 - 500/2}{10000} = 82.5\%.$$

Asset Score Example

Figure 7:
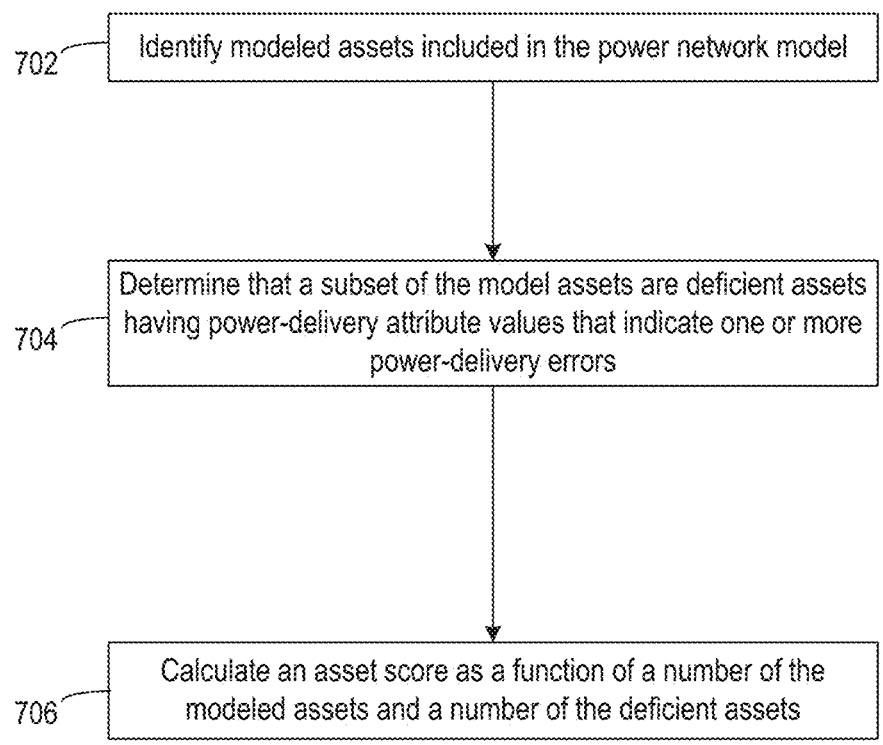
FIG. 7 is a flow chart depicting an example of a method for using the validation application to compute a connectivity score for a power network model.

FIG. 7 is a flow chart depicting an example of a method 700 for using the validation application 104 to compute a connectivity score for a power network model 202. For illustrative purposes, the method 1000 is described with reference to one or more of the examples described above with respect to FIGS. 1-6. Other implementations, however, are possible.

The method 700 involves identifying modeled assets included in the power network model, as shown in block 702. One or more suitable processing devices 402 of a validation server 102 can implement block 702 by executing program code that includes the validation application 104. The executed validation application 104 configures the validation server 102 to identify the power network modeled assets from the power network model 202.

The method 700 also involves determining that a subset of the power network modeled assets are deficient assets having power-delivery attribute values that indicate one or more power-delivery errors, as shown in block 704. One or more suitable processing devices 402 of a validation server 102 can implement block 704 by executing program code that includes the validation application 104. The executed validation application 104 configures the validation server 102 to identify which of the power network modeled assets has power-delivery attribute values indicating power-deliver errors and to identify those modeled assets as deficient assets.

Various attributes of the devices modeled in the electric power network 116 can be used to determine power-delivery errors. Examples of these attributes and corresponding power-delivery errors include incorrect node and winding voltage and power ratings, phase mismatches, missing model data, invalid connectivity loops, and switch states that cause connectivity issues. The validation application 104 can compute the asset score 206 based on some or all of these attributes.

The method 700 also involves calculating the asset score as a function of a number of the power network modeled assets and a number of the deficient assets, as shown in block 706. One or more suitable processing devices 402 of a validation server 102 can implement block 706 by executing program code that includes the validation application 104. The executed validation application 104 configures the validation server 102 to access the function from a suitable non-transitory computer-readable medium and apply the function to the power network modeled assets and the deficient assets. An increase in the number of the deficient assets causes the asset score to indicate increased power-delivery errors (e.g., by decreasing the asset score computed by the function).

In one example, the validation application 104 computes an asset score $S_A$ using the following formula.

$$S_A = \frac{n_{asset} - a_w n_w - a_r n_r - a_p n_p}{n_{asset}}. \quad (3)$$

In equation 3, the term $n_{asset}$ represents a number of assets in the power network model under consideration. The term $n_w$ represents a number of assets having incorrect voltage data. The term $a_w$ represents a weight applied to the number of assets having incorrect voltage data. The term $n_r$ represents a number of assets that are missing a rated kVA attribute. The term $a_r$ represents a weight applied to the number of assets that are missing a rated kVA attribute. The term $n_p$ represents a number of assets that are on the wrong phase. The term $a_p$ represents a weight applied to the number of assets that are on the wrong phase.

Equation 3 emphasizes the number of issues affecting each device (or asset) in the power distribution network. The weights applied to the various attributes indicate that different issues have different levels of importance for a specific smart grid application. In equation 3, an asset being affected by multiple issues results in a lower asset score than an asset being affected by only one issue.

In one example, the validation application 104 accesses a model of a power distribution network with $n_{asset}$=1000 assets. The validation application 104 retrieves the GIS data 108 from a non-transitory computer-readable medium and thereby identifies various attribute values for the power network modeled power distribution network. For instance, the validation application 104 determines that 100 assets have incorrect voltage data ($n_w$=100, weight $a_w$=0.3), 50 assets are missing a rated kVA attribute ($n_r$=50, weight $a_r$=0.2), and 150 assets are on the wrong phase ($n_p$=150, weight $a_p$=0.35). The validation application 104 computes the asset score $S_A$ from these values, and thereby determines that the asset score $$S_A = \frac{10000 - 0.3 \times 100 - 0.2 \times 50 - 0.35 \times 150}{1000} = 90.75\%.$$

Power-Flow Score Example

A simplified example is provided below with respect to the power-flow score 208. The power-flow score 208 can indicate whether the power flow calculations for the power network model 202 are providing reasonable results (e.g., whether the calculations are within a voltage range indicated by the rules, assumption, or outcomes referenced by the validation application 104). Non-convergence of power flow calculations (i.e. calculations that do not complete in a certain amount of iterations) or other outcomes of power flow calculations (e.g., voltage too low in one location, voltage too high in another location, etc.) can indicate that the power network model 202 is incorrect. The validation application 104 can perform a similar process to compute a connectivity score 204 and an asset score 206 of a power network model 202.

Examples of components used to compute the power-flow score 208 include voltage levels, current levels, power levels (active, reactive, apparent), power factor, angles between phases, and balance/imbalance between phases. The validation application 104 can compute the power-flow score 208 from some or all of these components.

A validation application 104 can perform power flow calculations for a given power network model 202. Computing the power flow can include computing voltages (e.g., magnitude and angle), currents, power (e.g., active, reactive, and apparent) at each node and phase of a power network model 202. These calculations can be performed using any power flow software.

In the example indicated in Table 1, the validation application 104 uses voltages for power flow calculations. Voltages between 95% and 105% of nominal voltage (commonly accepted normal voltage boundaries) can result in the maximum score for power flow calculations. If the calculations do not converge/complete, the power-flow score 208 is zero.

TABLE 1

| Outcome for each power flow run | Points |
|---|---|
| Does not complete or converge | 0 |
| Voltages outside of 85%-115% of nominal | 2 |
| Voltages in 95%-105% of nominal | 5 (Best) |

A more generalized example is provided in Table 2, provided below. Implementation-specific logic can be used to determine which outcome applies.

TABLE 2

| Outcome for each power flow run | Points |
|---|---|
| Outcome 1 | $C_1$ |
| Outcome 2 | $C_2$ |
| ... | ... |
| Outcome n | $C_n$ |

The validation application 104 or other suitable software can perform power flow calculations using multiple assumptions around one or multiple parameters in the power network model 202. The validation application 104 or other suitable software can assign, to each combination of assumptions, a respective weight that indicates the importance and likeliness of occurrence. One or more weights can be stored in a non-transitory computer-readable medium and provided by, for example, an entity from which the GIS data 108 or the additional data 110 is received. Higher weights can indicate the most expected assumptions or starting conditions. For instance, the table below provides an example of certain assumptions and associated weights:

TABLE 3

| Distributed generators? | Station voltage? | Weight |
|---|---|---|
| No | 100% | 4 |
| No | 105% | 2 |
| Yes | 100% | 6 |
| Yes | 105% | 4 |

In the simplified example below, the maximum score possible by summing the weighted points (points multiplied by weight) for each starting condition is 80 ((4+2+6+4)×5). A more generalized chart of assumptions/weights can be created as follows:

TABLE 4

| ID | Assumption 1 | ... | Assumption q | Weight |
|---|---|---|---|---|
| 1 | $a_{1\_1}$ | ... | $a_{q\_1}$ | $W_1$ |
| 2 | $a_{1\_2}$ | ... | $a_{q\_2}$ | $W_2$ |
| ... | ... | ... | ... | ... |
| P | $a_{1\_p}$ | ... | $a_{q\_p}$ | $W_p$ |

Similar tables can be populated and used for connectivity scores 204 and asset scores 206. In some aspects, additional or alternative scores can be used.

Example of Using Scores to Compare Network Models to Each Other

In some aspects, complex power network models are partitioned into smaller power network models (i.e., sub-models). Partitioning a power network model into sub-models increases the efficiency with which the validation application 104 can analyze the power network model under consideration (e.g., by simplifying the relevant power flow calculations). Partitioning a power network model into sub-models can also increase the speed and precision with which the validation application 104 can identify a portion of the power network model that is presenting issues interfering with validation.

For instance, the validation application 104 can partition a power network model into sub-models based on substations included within the power network modeled electric power network. In a simplified example, the electric power network can include a first substation, a first set of assets that are powered by the first substation, a second substation, and a second set of assets that are powered by the second substation. The validation application 104 partitions the corresponding power network model into a first substation model, which includes the first substation and the first set of assets, and a second substation model, which includes the second substation and the second set of assets. In each substation model, the substation acts as the power source for the sub-model. One or more feeders can be powered by the substation. In the partitioning process, the validation application 104 excludes assets that are not powered by a particular substation from that substation's sub-model.

In some aspects, certain power assets may, under normal operating conditions, simultaneously receive power from two substations. To model the interaction between the two substations, the validation application 104 can create a single power distribution sub-model that includes the two substations instead of one substation. Assets in the sub-model are treated as being powered by either substation.

The validation application 104 can compute, for each substation model, a respective connectivity score, a respective asset score, a respective power-flow score, and a respective global score. For instance, in an example involving an electric power network with four substations, the validation application 104 can compute the scores in Table 5 using equations 1-3.

TABLE 5

| Sub-model number | Substation | Connectivity Score $S_c$ (Max: 100%) | Asset Score $S_A$ (Max: 100%) | Power-flow score $S_P$ (Max: 1200) | Global Score (Max: 2500) |
|---|---|---|---|---|---|
| 1 | A | 85% | 85% | 900 | 2005 |
| 2 | B | 90% | 80% | 1025 | 2115 |
| 3 | C | 100% | 70% | 940 | 2000 |
| 4 | D | 70% | 90% | 1150 | 2220 |

In the example depicted in Table 5, the sub-model 4 has the highest overall score (2220), despite having the lowest connectivity score (70%).

The validation application 104 can use the different scores to compare the quality (or health) of the sub-models for different portions of the electric power network under consideration (e.g., an electric power grid). In some aspects, the validation application 104 can have different modes of operation for analyzing the power network model at different levels of granularity. For instance, the validation application 104 can operate in a global configuration mode in which the comparison is performed at the global level. The validation application 104 can operate in one or more additional configuration modes for analyzing connectivity, asset attributes, power flow, or other attributes of the power network model. For instance, the validation application 104 can be switched to the global configuration mode to analyze overall data quality. Alternatively, the validation application 104 can be switched to a connectivity configuration mode to analyze model connectivity using one or more connectivity scores.

In some aspects, the validation application 104 can have a trend configuration mode. The trend configuration mode can be used to compare different versions of the same portion of an electric power network over time. For instance, the validation application 104 can store various scores (e.g., one or more of the global score, connectivity score, asset score, etc.) in a database or other data structure. Each score can be stored along with a timestamp or other time indicator identifying a time at which the particular version of the power network model was used. In the trend configuration mode, the validation application 104 can retrieve various scores and their corresponding time identifiers. The validation application 104 can display, via a graphical interface, one or more retrieved score types (e.g., various connectivity scores over a certain time period, various asset scores over a certain time period, etc.). This display allows for comparing scores over time, which allows for determining variations in data quality and evaluating the consistency of the underlying data or data translation operations.

The defined scores allow for ranking different sub-models of an electric power network in terms of data quality or data health. This ranking allows decision-makers to monitor data quality in their enterprise systems in a meaningful way.

Figure 3:
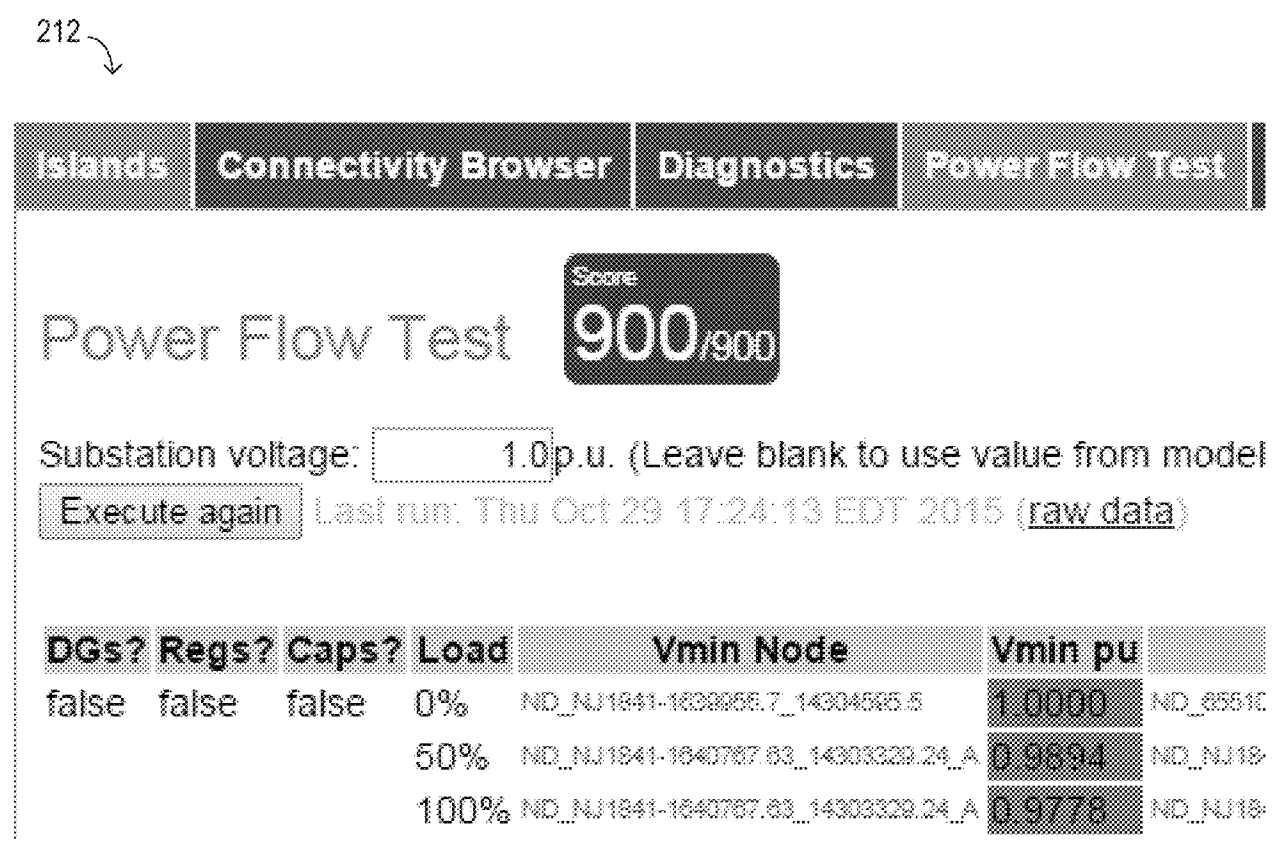

The validation application 104 can provide a user interface 212 for interactively launching, updating, displaying, or otherwise using the calculation of the validation scores described above and displaying the results to a user. The validation application 104 uses the interface 212 to display the global score for each power network model 202. In some aspects, the validation application 104 can also display intermediate scores in each category. The validation application 104 provides the user interface 212 for comparing scores between multiple models as well. FIG. 3 depicts an example of the interface 212 used by a validation application 104 to display results and other output data generated by validating power network models.

Using the same power flow calculation software and topological analysis software, the validation application 104 can execute one or more algorithms that provide recommendations to improve one or more of the scores calculated for a given power network model. For instance, the validation application 104 can detect errors in calculated voltages that contribute to a reduced score. The validation application 104 can display possible reasons for the voltage errors, such as incorrect transformer ratios, excessive impedances or reactive power supply, etc. As another example, the validation application 104 can detect topological errors or issues, such as nodes that are within a threshold proximity of one another, phase mismatches, etc. The validation application 104 can recommend solutions for addressing these topological errors or issues, such as merging nodes within a threshold proximity, correcting phases, etc.

The recommendations generated by the validation application 104 can be implemented in any suitable manner. In some aspects, the validation application 104 (or another application in communication with the validation application 104) can automatically apply these recommendations without user supervision or intervention. For example, the validation application 104 can access relevant model data from a non-transitory computer-readable medium and update the power network model data in accordance with the recommendations. In additional or alternative aspects, the validation application 104 can output the recommendations to a user via a graphical interface. If the validation application 104 receives a selection of a particular recommendation via the graphical interface (i.e., a command from a user who has decided to act on the recommendation) the validation application 104 can access relevant model data from a non-transitory computer-readable medium and update the power network model data in accordance with the selected recommendation.

If one or more recommendations are implemented, the validation application 104 (or another application in communication with the validation application 104) generates an updated version of the power network model. The updated version of the power network model includes one or more changes corresponding to the implemented recommendations. The validation application 104 computes one or more new scores (e.g., a global score or one or more component scores) for the updated version of the power network model. The updated scores can be computed in the manner described above. Based on model corrections adopted by the user, the score for the updated version of the power network model could be better than a prior score for a prior version of the power network model.

The user can repeat this process until one or more desired scores have been obtained. Responsive to one or more user commands, the validation application 104 can export, save, or otherwise output the version of the power network model having the satisfactory score. For example, the outputted version of the power network model can be stored in a non-transitory computer-readable medium that is accessible to other systems, such as computing systems that execute Advanced Grid Analytics software, power systems simulation and planning software, and Distribution Management System ("DMS") or Energy Management System ("EMS") applications used by utility operations centers.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these, and similar terms, are to be associated with appropriate physical quantities and are merely convenient labels. Unless specifically stated otherwise, it is appreciated that throughout this specification, discussions utilizing terms such as "processing," "computing," "calculating," "determining," and "identifying" or the like refer to actions or processes of a computing device, such as one or more computers or a similar electronic computing device or devices, that manipulates or transforms data represented as physical electronic or magnetic quantities within memories, registers, or other storage devices, transmission devices, or display devices of the computing platform.

The system or systems discussed herein are not limited to any particular hardware architecture or configuration. A computing device can include any suitable arrangement of components that provide a result conditioned on one or more function calls. Suitable computing devices include multi-purpose microprocessor-based computer systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied; for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, and/or additions to the present subject matter as would be readily apparent to one of ordinary skill in the art.

What is claimed is:

1. A method comprising:
   accessing, by a computing device, a power network model generated from data describing assets and power stations of an electric power network, wherein the power network model includes a modeled power source and a plurality of modeled nodes;
   computing, by the computing device, a validation score for the power network model by performing operations comprising:
      computing a connectivity score based on a number of modeled nodes and a number of de-energized nodes in the power network model, wherein de-energized nodes lack connectively to the modeled power source;
      computing an asset score based on a number of assets and a number of deficient assets in the power network model, wherein deficient assets have a power-delivery attribute value that indicates a power-delivery error;
      computing a power-flow score indicating power-flow calculation errors in the power network model with respect to voltage ranges specified for the electric power network; and
      calculating the validation score from the connectivity score, the asset score, and the power-flow score; and outputting, by the computing device, the power network model to a control system, wherein the control system is configured to control an operation of the electric power network.

2. The method of claim 1, further comprising:
comparing the validation score to a threshold validation score,
wherein the power network model is outputted when the validation score meets or exceeds the threshold validation score, and
wherein the power network model is modified when the validation score does not meet or exceed the threshold validation score.

3. The method of claim 2, further comprising:
modifying, by the computing device, at least one element in the power network model, wherein at least one of the validation score, the asset score, and the power-flow score is computed based on (a) the at least one element and (b) at least one updated value of the at least one of the validation score, the asset score, and the power-flow score is computed from the at least one element having the modification.

4. The method of claim 2, wherein modification of the power network model changes one or more of (i) connections in the power network model, (ii) power-delivery attributes in the power network model, and (iii) power-flow calculations in the power network model.

5. The method of claim 1, wherein computing the connectivity score comprises:
detecting connections among the modeled nodes in the power network model and a modeled power source in the power network model;
generating, in a non-transitory computer-readable medium, a graph data structure representing the modeled nodes and the connections;
detecting, from the connections represented in the graph data structure, the de-energized nodes in the power network model that lack connectivity to the modeled power source; and
calculating the connectivity score as a function of the number of the modeled nodes and the number of the de-energized nodes, wherein an increase in the number of the de-energized nodes causes the connectivity score to indicate increased connectivity errors.

6. The method of claim 1, wherein computing the asset score comprises:
identifying modeled assets included in the power network model;
identifying the deficient assets with a power-delivery attribute value indicating a power-delivery error; and
calculating the asset score as a function of the number of the modeled assets and the number of the deficient assets, wherein an increase in the number of the deficient assets causes the asset score to indicate increased power-delivery errors.

7. The method of claim 1, wherein computing the power-flow score comprises:
calculating voltages at each of the plurality of modeled nodes and for a plurality of phases; and
calculating the power-flow score based on a comparison of the calculated voltages to nominal voltage ranges specified for the electric power network.

8. A method comprising:
accessing, by a computing device, a power network model generated from data describing assets and power stations of an electric power network, wherein the power network model includes a first modeled power source, a first plurality of modeled nodes powered by the first modeled power source, a second modeled power source, and a second plurality of modeled nodes powered by the second modeled power source;
partitioning, by the computing device, the power network model into a first sub-model and a second sub-model, wherein the first sub-model includes the first modeled power source and the first plurality of modeled nodes and the second sub-model includes the second modeled power source and the second plurality of modeled nodes;
for each of the first sub-model and the second sub-model, computing, by the computing device, a global score for the sub-model by performing operations comprising:
computing a connectivity score based on a number of modeled nodes and a number of de-energized nodes in the sub-model;
computing an asset score based on a number of modeled assets and a number of deficient assets in the sub-model;
computing a power-flow score based on power flow calculations corresponding to the modeled nodes in the sub-model; and
calculating the global score for the sub-model from the connectivity score, the asset score, and the power-flow score; and
outputting, by the computing device, the first sub-model and the second sub-model to a control system, wherein the control system is configured to control an operation of the electric power network.

9. The method of claim 8, wherein the power network model includes a third modeled power source, a fourth modeled power source, and a third plurality of modeled nodes, wherein the third plurality of modeled nodes includes a modeled node that receives power from the third modeled power source and the fourth modeled power source, further comprising:
partitioning, by the computing device, the power network model into a third sub-model, wherein the third sub-model includes the third modeled power source, the fourth modeled power source, and the third plurality of modeled nodes.

10. The method of claim 8, wherein computing the connectivity score comprises:
detecting connections among the modeled nodes in the sub-model and the modeled power source in the sub-model;
generating, in a non-transitory computer-readable medium, a graph data structure representing the modeled nodes and the connections;
detecting, from the connections represented in the graph data structure, de-energized nodes in the sub-model that lack connectivity to the modeled power source; and
calculating the connectivity score as a function of the number of the modeled nodes and the number of the de-energized nodes, wherein an increase in the number of the de-energized nodes causes the connectivity score to indicate increased connectivity errors.

11. The method of claim 8, wherein computing the asset score comprises:
identifying modeled assets included in the sub-model;
identifying deficient assets with a power-delivery attribute value indicating a power-delivery error; and
calculating the asset score as a function of the number of the modeled assets and the number of the deficient assets, wherein an increase in the number of the deficient assets causes the asset score to indicate increased power-delivery errors.

12. The method of claim 8, wherein computing the power-flow score comprises:
calculating voltages at each of the modeled nodes in the sub-model; and
calculating the power-flow score based on a comparison of the calculated voltages to nominal voltage ranges specified for the electric power network.

13. The method of claim 8, further comprising:
ranking the first sub-model and the second sub-model based on the global scores for the sub-models.

14. The method of claim 13, further comprising:
based on the ranking of the first sub-model and the second sub-model, selecting one of the first sub-model or the second sub-model for further analysis, wherein the further analysis identifies errors in calculated values that reduced one of the connectivity score, the asset score, or the power-flow score for the selected sub-model and provides a recommended modification for modifying the selected sub-model.

15. A system comprising:
a control system configured for identifying and correcting errors in an electric power network;
a non-transitory computer-readable medium storing a power network model generated from data describing assets and power stations of the electric power network; and
a processing device communicatively coupled to the non-transitory computer-readable medium and the control system, the processing device configured for:
accessing the power network model from the non-transitory computer-readable medium,
computing a validation score for the power network model by performing operations comprising:
computing a connectivity score for the power network model,
computing an asset score for the power network model,
computing a power-flow score for the power network model, and
calculating the validation score from the connectivity score, the asset score, and the power-flow score;
modifying the power network model to change at least one element in the power network model,
computing an updated validation score based on the modification to the power network model, wherein at least one of an updated validation score, an updated asset score, and an updated power-flow score changes based on the at least one element; and
providing the control system with access to the power network model having the modification, wherein the control system is configured to control an operation of the electric power network.

16. The system of claim 15, wherein the processing device is further configured for:
comparing the updated validation score to a threshold validation score,
outputting the power network model having the modification when the updated validation score meets or exceeds the threshold validation score.

17. The system of claim 15, wherein the power network model having the modification changes one or more of (i) connections in the power network model, (ii) power-delivery attributes in the power network model, and (iii) power-flow calculations in the power network model.

18. The system of claim 15, wherein the processing device is further configured for computing the connectivity score by:
detecting connections among modeled nodes in the power network model and a modeled power source in the power network model;
generating, in the non-transitory computer-readable medium, a graph data structure representing the modeled nodes and the connections;
detecting, from the connections represented in the graph data structure, de-energized nodes in the power network model that lack connectivity to the modeled power source; and
calculating the connectivity score as a function of a number of the modeled nodes and a number of the de-energized nodes, wherein an increase in the number of the de-energized nodes causes the connectivity score to indicate increased connectivity errors.

19. The system of claim 15, wherein the processing device is further configured for computing the asset score by:
identifying modeled assets included in the power network model;
identifying deficient assets with a power-delivery attribute value indicating a power-delivery error; and
calculating the asset score as a function of a number of the modeled assets and a number of the deficient assets, wherein an increase in the number of the deficient assets causes the asset score to indicate increased power-delivery errors.

20. The system of claim 15, wherein the processing device is further configured for computing the power-flow score by:
calculating voltages at each of a plurality of modeled nodes and for a plurality of phases; and
calculating the power-flow score based on a comparison of the calculated voltages to nominal voltage ranges specified for the electric power network.

* * * * *